US00RE36410E

United States Patent [19]

Meshberg

[11] E Patent Number: Re. 36,410

[45] Reissued Date of Patent: Nov. 30, 1999

[54] INSERTABLE BARRIER BAG OR LINER FOR A NARROW NECK DISPENSING CONTAINER AND METHOD OF FILLING SUCH A BARRIER BAG OF LINER

[76] Inventor: Philip Meshberg, 2770 S. Ocean Blvd. Apartment 602, Palm Beach, Fla. 33480

[21] Appl. No.: 08/706,044

[22] Filed: Aug. 30, 1996

Related U.S. Patent Documents

Reissue of:

[64] Patent No.: 5,343,901
Issued: Sep. 6, 1994
Appl. No.: 08/032,585
Filed: Mar. 17, 1993

[51] Int. Cl.[6] ..... B65B 1/04; B65D 37/00

[52] U.S. Cl. ..... 141/2; 141/18; 222/105; 222/382; 222/464.1; 222/481.5

[58] Field of Search ..... 222/95, 105, 183, 222/383.1, 382, 481.5, 211, 209, 321.1, 321.7, 321.9, 464.1; 141/2, 10, 18

[56] References Cited

U.S. PATENT DOCUMENTS

| | | | |
|---|---|---|---|
| 3,229,730 | 1/1966 | Welty et al. | 141/18 |
| 3,361,303 | 1/1968 | Jacuzzi | 222/183 |
| 3,507,309 | 4/1970 | Johnson | 141/18 |
| 4,008,830 | 2/1977 | Meshberg | 222/95 |
| 4,020,978 | 5/1977 | Szczepanski | 222/209 |
| 4,159,790 | 7/1979 | Bailey | 222/464.2 X |
| 4,322,020 | 3/1982 | Stone | 222/105 X |
| 4,457,454 | 7/1984 | Meshberg | 222/95 |
| 4,457,455 | 7/1984 | Meshberg | 222/105 |
| 4,625,897 | 12/1986 | Wortley | 222/205 |
| 4,696,415 | 9/1987 | Meshberg | 222/387 X |
| 4,709,734 | 12/1987 | Rudick et al. | 141/2 |
| 4,865,224 | 9/1989 | Streck | 222/105 |
| 5,004,123 | 4/1991 | Stoody | 222/105 X |
| 5,012,956 | 5/1991 | Stoody | 222/95 |
| 5,020,691 | 6/1991 | Nye | 222/105 X |
| 5,100,027 | 3/1992 | Gueret | 222/105 |
| 5,115,944 | 5/1992 | Nikolich | 222/105 X |
| 5,135,137 | 8/1992 | Rudick | 222/105 X |
| 5,137,179 | 8/1992 | Stoffel | 222/105 X |
| 5,143,294 | 9/1992 | Lintvedt | 222/105 X |
| 5,156,299 | 10/1992 | De Caluwe et al. | 222/105 X |
| 5,156,300 | 10/1992 | Spahni et al. | 222/105 |
| 5,176,294 | 1/1993 | Della Riva | 222/105 |
| 5,255,826 | 10/1993 | Ranalletta et al. | 222/209 |
| 5,261,565 | 11/1993 | Drobish et al. | 222/105 X |
| 5,265,766 | 11/1993 | Kurtzahn et al. | 141/18 X |

FOREIGN PATENT DOCUMENTS

| | | |
|---|---|---|
| 0193054 | 9/1986 | European Pat. Off. . |
| 0473994 | 3/1992 | European Pat. Off. . |
| 0499538 | 8/1992 | European Pat. Off. . |
| 2655315 | 6/1991 | France . |
| 2 685 285 | 6/1993 | France . |
| 2710 984 | 9/1978 | Germany . |
| 2 155117 | 9/1985 | United Kingdom . |
| 8202034 | 6/1982 | WIPO . |

*Primary Examiner*—Kevin P. Shaver
*Attorney, Agent, or Firm*—Kenyon & Kenyon

[57] ABSTRACT

A dispensing container including a interior barrier bag is disclosed, along with a method for filling the barrier bag with a material to be dispensed. The dispensing structure includes a non-vented pump and a dip tube structure, and a mechanism for venting the interior of the container to the atmosphere and for venting the interior of the barrier bag during filling. During assembly and filling, the barrier bag is wrapped or collapsed around the dip tube structure, so that the dip tube structure and the barrier bag can be easily inserted into a conventional container. After insertion, the barrier bag is inflated (with either an air blast or the introduction of the dispensed product) and filled with product. After filling a pump structure can be attached to the container. The method and apparatus allow a barrier bag device to be used on conventionally-designed container structures. The method and apparatus are particularly useful with containers which are made up at least partially of recycled materials.

17 Claims, 2 Drawing Sheets

INSERTABLE BARRIER BAG OR LINER FOR A NARROW NECK DISPENSING CONTAINER AND METHOD OF FILLING SUCH A BARRIER BAG OF LINER

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a dispenser including a dispensing pump and a dispensing container. More particularly, the present invention relates to a dispensing container which includes a barrier bag for protecting the dispensed contents from contamination within the container.

2. Description of the Related Art

It is generally known to provide a barrier bag within a dispensing device to protect the contents contained within the dispenser from any other materials which may be in the container. For example, U.S. Pat. Nos. 4,009,830; 4,020,978; 4,457,455; 4,457,454; 4,696,415; 5,004,123; 5,012,956; 5,020,691; 5,115,944; 5,135,137; 5,137,179; 5,143,294; 5,156,295; 5,156,299; 5,156,300 and 5,176,294 each show dispensing devices wherein a barrier bag is used to surround and seal the dispensed contents within the dispensing container. Often, the barrier bag is used to prevent contact between a pressurized gas used to propel the contents out, e.g. in an aerosol device, and the contents themselves. In other prior art devices, the barrier bag is used to prevent contact between the dispensed contents and air which may be contained within the container.

In the prior art devices containing a barrier bag, it is often necessary to use a special fitting on the upper portion of the container to allow for the insertion and filling of the barrier bag. This special fitting makes prior art barrier bag systems incompatible with standard dispensing containers, an also requires additional assembly steps. Furthermore, the prior art devices containing barrier bags are not constructed to be used with conventional non-vented pumps which include a vented container structure.

SUMMARY OF THE INVENTION

The present invention is directed to an insertable barrier bag or liner, that can be automatically inserted through the neck of a conventionally-shaped plastic bottle or container. The present invention includes structure for venting air from the interior of the barrier bag while the bag is being filled with product, as well as structure for venting air in the space between the interior walls of the container and the exterior wall of the barrier bag.

The venting structures of the present invention are provided in a fitting which is designed to fit within the neck of a container or bottle. The fitting is designed so that a bag made of a bar material can be sealed on an outer surface of the fitting to provide a leakproof seal of the barrier bag to the fitting. The barrier bag is affixed in a position so that it clears the neck of the container when the fitting is inserted into the bottle or container, allowing the full expansion of the bag within the walls of the container.

The fitting is designed to receive a dip tube with a diameter which permits the barrier bag to be wrapped around the dip tube before insertion in the bottle or container. The barrier bag remains wrapped around the dip tube by its own adhesion properties, static adhesion, or through use of an adhesive, and can therefore be easily and automatically inserted into the container through the neck of the container prior to a filling operation. Because the dip tube is part of the attached to the fitting structure and barrier bag when they are inserted into the container, a dip tube structure need not be attached to the pump structure when it is connected to the container.

The fact that the barrier bag is wrapped around the dip tube before filling is an advantageous feature of the present invention, because it minimizes the amount of air trapped in the barrier bag, allowing filling of the barrier bag at maximum speed. The present invention is therefore advantageous because it allows easy assembly and filling of a dispensing container with an interior barrier bag and may be used on any conventionally shaped dispensing container or bottle used in conjunction with a conventional non-vented pump. The present invention includes an easy to manufacture structure for venting the container interior. The present invention is easy to insert into a container, and easy to fill once inserted into the container, without the use of complicated assembly or filling equipment.

DESCRIPTION OF THE PREFERRED EMBODIMENTS

Figure 1:
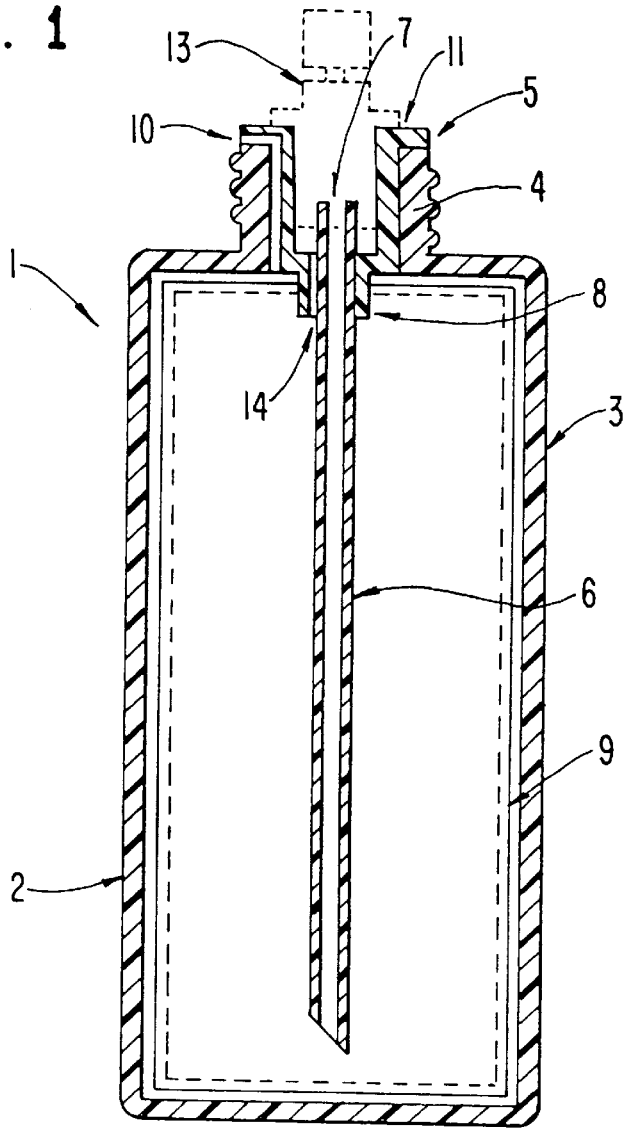
FIG. 1 shows a cross-sectional view of the present invention, with the barrier bag in an expanded state.

FIG. 1 shows a first embodiment of the present dispensing device. A dispenser 1 includes a dispensing container 2. Dispensing container 2 may be of a conventional form which includes a relatively wide body portion 3 and a relatively narrow neck portion 4. Neck portion 4 can include threads for engagement with threads on a cap (not shown), or a cap could be crimped or attached by any known means to neck portion 4.

Figure 2:
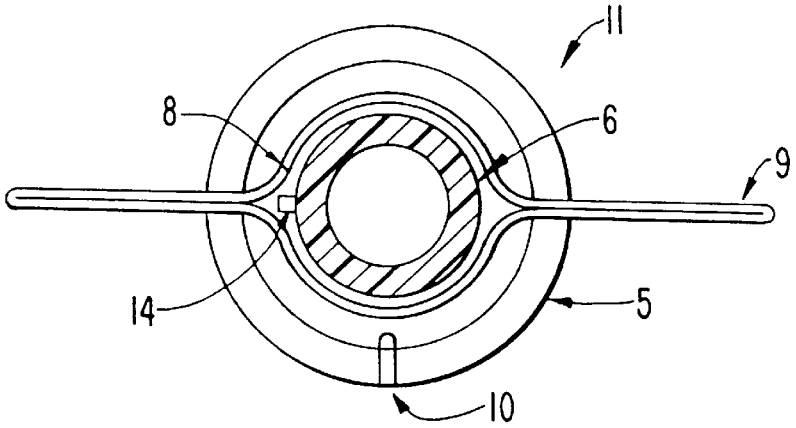
FIG. 2 shows a cross-sectional bottom view of the barrier bag and fitment of the present invention.

Inserted within container is a dip tube 6 for conveying a dispensed product from the container to a pump structure 7. Dip tube 6 is connected to a fitment 11 via a dip tube retaining portion 8 which retains the dip tube 6 and a barrier bag 9 in the container 2. As shown in FIG. 2, the upper portion of barrier bag 9 is sealed (through conventional means, e.g., ultrasonic welding or adhesives) to fitment 11 via the dip tube retaining portion 8, so as to seal the interior of barrier bag 9 from the interior of container 2. FIG. 2 shows the barrier bag 9 in a flattened condition, for example when it is first attached to the fitment 11.

Barrier bag 9 is constructed of a thin sheet of a barrier film (e.g. foil or a polymeric material) which is bonded around the edges to form a sealed structure. As can be seen in FIG. 2, the upper edges of the film which makes up the barrier bag 9 are bonded together at their radially outer ends, and as described above the radially inner portions of the upper edges of the film are bonded to the fitment 11 so that the bag is sealed to the fitment 11. The radially outer and lower edges of the film are bonded together to form a sealed barrier bag 9.

Figure 3A:
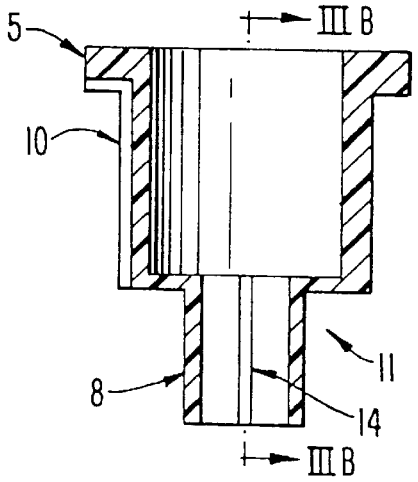
FIGS. 3a and 3b show cross-sectional views of the fitment of the present invention.
Figure 3B:
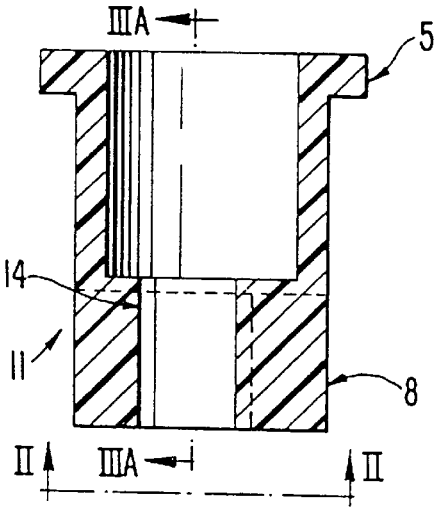

FIGS. 2, 3a and 3b show the particular structure of the fitment of the present invention. As can be seen in FIG. 2, dip tube retaining portion 8 includes an outer surface upon which the barrier bag 9 is bonded to form a seal. A second vent structure 14 passes through the interior of the dip tube retaining portion 8 between the dip tube 6 and the dip tube retaining portion 8. As will be described below, this second vent structure 14 allows air to be vented out of the dip tube 6 and barrier bag 9 during filling. A vent structure 10 on the outer surface of fitment 11 allows the interior of the container 2 to be vented to the atmosphere to maintain atmospheric pressure on the exterior of the barrier bag 9. Fitment 11 includes a flange 5 to allow engagement of the fitment 11 with the neck 4 of container 2.

Figure 4:
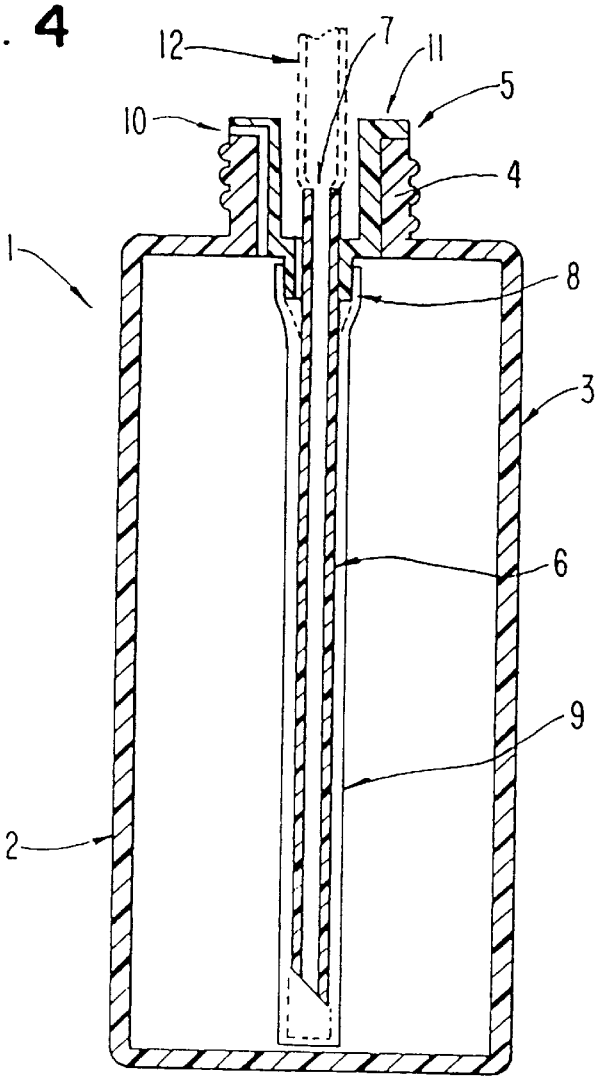
FIG. 4 shows a cross-sectional view of the present invention, with the barrier bag wrapped around the dip tube.

FIG. 4 shows the barrier bag 9 and fitment 11 in their configuration immediately after insertion into container 2. In order to allow easy insertion of the bag 9 into a conventional container 2, the bag is initially wrapped around the dip tube 6 so as to exhibit a low cross-sectional profile. The barrier bag 9 can be retained in a position wrapped around the dip tube 6 through its own adhesive properties (as with some thermoplastics), through static adherence, or through the use of a low shear-strength adhesive on the exterior of the barrier bag 9. Although the barrier bag 9 is preferably wrapped around the dip tube 6, the barrier bag could also be collapsed around the dip tube in any other equivalent manner, including using a pleated barrier bag 9 which is collapsed in an "accordion" manner around the dip tube 6.

After the dip tube 6, barrier bag 9, and fitment 11 structures are inserted as a unit into the container 2, the barrier bag can be inflated to the shape shown in FIG. 1. Inflation can be accomplish by an air blast directed from above down the dip tube 6, or can occur during filling of the barrier bag 9 with a product to be dispensed. To fill the barrier bag 9 with a product to be dispensed, a filling nozzle 12 (shown in dotted lines in FIG. 4) is inserted into the interior of fitment 11 to engage the top 7 of dip tube 6, and product is dispensed down the dip tube 6 and into the interior of the barrier bag 9 until the barrier bag 9 is filled with product. A vent structure 10, consisting of a groove channelled into the exterior of the fitment 11, is used during filling to vent air in the interior of the container 2 which is displaced during filling of the barrier bag 9. A second vent structure 14 is used to vent air initially contained within the dip tube 6 and barrier bag 9 to the atmosphere as this air is displaced by product during filling of the barrier bag 9.

After barrier bag 9 is filled with product, a conventional pump structure 7 (shown in dotted lines in FIG. 1) is inserted into fitment 11 and attached by any known conventional mechanism. The upper end 7 of dip tube 6 projects upwardly into fitment 11 so that it can be inserted directly into the inlet to pump 13. Pump structure 13 can include any form of conventional dispensing actuator/dispensing nozzle structure. Thus, as is known in the art, an actuator on the pump 13 is actuated, product will be drawn into the pump 13 and dispensed out a nozzle on actuator. During the return stroke of the pump, product is drawn into the interior of pump 13 through dip tube 6; the atmospheric pressure which exists in the container 2 interior—by way of the venting structure 10—allows fluid to be drawn into the pump 13 and the barrier bag 9 to gradually collapse around dip tube 6. Eventually, the barrier bag 9 will completely collapse around dip tube 6 as product is dispensed, so that removal of the dip tube 6, barrier bag 9 and fitment 11 can be easily accomplished through neck 4 of container 2. The container then can be refilled using the process described above, using a new barrier bag 9/dip tube 6/fitment 11.

As will be readily understood, the barrier bag 9, retaining structure 8 and container could have a variety of shapes, depending upon the particular application. Furthermore, the vent structures 10 and 14 could be located in a variety of locations on the disclosed structure, as long as they provide the recited functions above. It will be understood that multiple variations of the disclosed structure are contemplated within the scope of the claims below.

I claim:

1. A method of providing a dispensing container comprising the steps of:

(a) providing a container;

(b) inserting a sealed barrier structure into an interior of said container, said barrier structure being collapsed around a dip tube structure extending substantially within the barrier structure, said dip tube structure being connected to a retaining structure including a vent providing fluid communication between the interior of said container and the atmosphere;

(c) expanding said barrier structure to substantially fill the interior of said container;

(d) filling said barrier structure with a product to be dispensed through said dip tube structure; and (e) attaching a pump structure to said container in fluid communication with said dip tube structure.

2. The method of claim 1, wherein:

the step of inserting a sealed barrier structure into an interior of said container includes said barrier bag structure being wrapped around said dip tube structure.

3. The method of claim 1, wherein:

the step of inserting a sealed barrier structure into an interior of said container includes said barrier bag structure being statically adhere to said dip tube structure.

4. A method of providing a dispensing container comprising the steps of:

(a) providing a container;

(b) inserting a sealed barrier structure into an interior of said container, said barrier structure being collapsed around a dip tube structure extending substantially within the barrier structure, said dip tube structure being connected to a retaining structure including a vent providing fluid communication between the interior of said container and the atmosphere;

(c) filling said barrier structure with a product to be dispensed through said dip tube structure, thereby expanding said barrier structure to substantially fill the interior of said container; and (d) attaching a pump structure to said container in fluid communication with said dip tube structure.

5. The method of claim 4, wherein:

the step of inserting a sealed barrier structure into an interior of said container includes said barrier bag structure being wrapped around said dip tube structure.

6. The method of claim 4, wherein:

the step of inserting a sealed barrier structure into an interior of said container includes said barrier bag structure being statically adhered to said dip tube structure.

7. A barrier structure for holding a product to be dispensed, comprising:

(a) a fitment structure including an axially inner end, said fitment structure including a venting path on a radially outer surface of said fitment structure, said fitment structure further comprising a second venting path on a radially inner surface of said axially inner end;

(b) a flexible bag structure sealingly secured to said axially inner end of said fitment; and (c) a dip tube structure connected to said axially inner end of said fitment *structure* and extending axially within an interior of said flexible bag structure.

8. An interior product container for use in a dispenser having an outer container structure including a neck portion, comprising:

(a) a fitment structure including an axially inner end, said fitment structure being engageable with said neck portion, said fitment structure including a first vent for providing fluid communication between an interior of said container structure and the atmosphere when said product container is inserted within said container structure;

(b) a flexible bag structure sealingly secured to said axially inner end of said fitment; and (c) a dip tube structure connected to said axially inner end of said fitment and extending axially within an interior of said flexible bag structure, wherein said fitment structure comprises a second vent for providing fluid communication between the interior of said flexible bag structure and the atmosphere during a filling process wherein product fills said flexible bag structure through said dip tube structure.

9. A dispensing apparatus comprising:

(a) a container;

(b) a sealed barrier structure within an interior of said container;

(c) a retaining structure, said retaining structure including a vent providing fluid communication between the interior of said container and the atmosphere;

(d) a dip tube structure extending within an interior of said barrier structure, said barrier structure being sealed around said dip tube structure, said dip tube structure being connected to said retaining structure; and (e) a pump structure connected to said retaining structure and in fluid communication with said dip tube structure, wherein said barrier structure is initially collapsed against said dip tube structure when not filled with a product to be dispensed, and wherein said barrier structure expands to substantially fill the interior of said container when filled with said product to be dispensed.

10. The dispensing apparatus of claim 9, wherein:

said container comprises a neck portion, and wherein said retaining structure is retained within said neck portion.

*11. A barrier structure for holding a product to be dispensed, comprising:*

*(a) a fitment including an axially inner end, said fitment comprising a venting path on a radially outer surface of said fitment, said fitment further comprising a second venting path on a radially inner surface of said fitment;*

*(b) a flexible bag structure sealingly secured to said fitment.*

*12. The barrier structure of claim 11, wherein:*

*said second venting path is on a radially inner surface of said axially inner end.*

*13. A dispensing apparatus for holding a product to be dispensed, comprising:*

*(a) a container;*

*(b) a fitment including an axially inner end, said fitment comprising a venting path on a radially outer surface of said fitment, said fitment further comprising a second venting path on a radially inner surface of said fitment;*

*(c) a flexible bag structure sealingly secured to said fitment.*

*14. The dispensing apparatus of claim 13, wherein:*

*said second venting path is on a radially inner surface of said axially inner end.*

*15. A method of filling a dispensing container comprising the steps of:*

*(a) providing a container;*

*(b) inserting a sealed barrier structure into an interior of said container, said barrier structure comprising a flexible bag and a fitment, said flexible bag being sealed to said fitment, said fitment comprising a venting path on a radially outer surface of said fitment and a second venting path on a radially inner surface of said fitment;*

*(c) filling said flexible bag with a product to be dispensed, said step of filling said flexible bag comprising the steps of venting air from an interior of said flexible bag through said second venting path and venting air from an interior of said container through said venting path.*

*16. The method of claim 15, further comprising the step of:*

*attaching a pump structure to said container after said step of filling said flexible bag.*

*17. The method of claim 15, further comprising the step of:*

*expanding said flexible bag to substantially fill an interior of said container to said step of filling said flexible bag.*

* * * * *